United States Patent [19]

Lugay et al.

[11] Patent Number: 5,084,296
[45] Date of Patent: Jan. 28, 1992

[54] PROCESS FOR MAKING SIMULATED FRUIT PIECES

[75] Inventors: Joaquin C. Lugay, Mahopac, N.Y.; Julia L. Newkirk, Battle Creek, Mich.; Keisuke Morimoto, Congers, N.Y.; Pradip K. Roy, Cranbury, N.J.

[73] Assignee: Kraft General Foods, Inc., Glenview, Ill.

[21] Appl. No.: 472,139

[22] Filed: Jan. 30, 1990

[51] Int. Cl.$^5$ .............................................. A23L 1/05
[52] U.S. Cl. ..................................... 426/573; 426/104; 426/250; 426/516; 426/518; 426/577; 426/615; 426/639; 426/803
[58] Field of Search ............... 426/573, 620, 104, 250, 426/577, 98, 803

[56] References Cited

U.S. PATENT DOCUMENTS

| | | | |
|---|---|---|---|
| 3,892,870 | 7/1975 | Wood | 426/577 |
| 3,922,360 | 11/1975 | Sneath | 426/577 |
| 4,256,772 | 3/1981 | Shanbhag et al. | 426/620 |
| 4,348,418 | 9/1982 | Smith et al. | 426/577 |
| 4,401,681 | 8/1983 | Dahle | 426/577 |
| 4,504,504 | 3/1985 | Gaehring et al. | 426/577 |
| 4,542,033 | 9/1985 | Agarwala | 426/620 |

*Primary Examiner*—R. B. Penland
*Attorney, Agent, or Firm*—Thomas A. Marcoux; Thomas R. Savoie; Linn I. Grim

[57] ABSTRACT

The present invention is concerned with a simulated fruit piece suitable for combination with a dry food product having a moisture typically of from 2–3% and wherein the fruit piece maintains its softness and the food product maintains its crispness after various storage conditions, said fruit consisting of fruit solids, a fruit concentrate, a thickening agent, edible food grade acid, sweeteners, coloring, and glycerol. The glycerol/sweetener combination functions as a humectant system which produces a fruit product with an Aw of between about 0.2 to 0.50. A process for preparing said fruit piece is also disclosed wherein a solid phase comprising a fruit solids is combined with a hot liquid phase and the mixture extruded into fruit ropes or strands and cut into the desired shape or form.

6 Claims, No Drawings

PROCESS FOR MAKING SIMULATED FRUIT PIECES

FIELD OF THE INVENTION

The present invention is concerned with a process for preparing simulated fruit. More particularly, the present invention is concerned with fruit pieces fabricated from solids of fruit materials to be used as a substitute for natural fruit to be consumed individually or comingled with other food products.

BACKGROUND OF THE INVENTION

The combination of fruit and dry breakfast cereals has significant consumer appeal. The food industry, recognizing the wide enjoyment of fresh fruit with dry breakfast cereal has in the past developed products composed of dry cereal combined with dehydrated fruits. Although enjoying some consumer acceptance, manufacturers of breakfast cereals have been aware of the deficiencies inherent in breakfast products in which a dry cereal is packaged with a dehydrated fruit and have sought methods to improve upon the quality of these products.

Dried fruits such as raisins, dried apples, dried peaches, i.e., fruits containing moisture between 13 to 23%, tend to dehydrate further and become hard and chewy when added to breakfast cereals that contain moisture at levels of between 2 and 3%. This is generally noticable after about four to eight weeks of storage, especially when the fruit's moisture drops below 10% which is the critical moisture for most dry fruits. At this point the fruit becomes unacceptably hard. This generally causes the cereal base to increase in moisture to above 5% beyond which level the cereal begins to lose its crispness.

To retard moisture migration from the fruit to the cereal base it has been the practice over the years to add some moisture to the cereal base, usually amounts sufficient to raise the moisture of the cereal to about 7.5%. This allows the fruit, i.e., raisins, to remain soft even after equilibration. However, the moisture level of the cereal flakes becomes dangerously close to the critical point where the flake begins to lose its crispness (around 7-8%).

Attempts to solve this problem are disclosed in U.S. Pat. No. 4,256,772 by Shanbhag et al. wherein the fruit to be blended with the cereal is infused with an aqueous solution of polyhydric alcohol and a sugar solution and dried to a moisture of between 18% and 34% followed by dusting with a moisture binder to prevent sticking. This treatment was designed to maintain the softness of the fruit using the humectant and plasticizing properties of the polyhydric alcohols and sugars. However, some moisture migration still occurs. Also, U.S. Pat. No. 4,542,033 by Agarwala discloses a process for preparing shelf stable fruit pieces wherein fresh fruit pieces are first treated to deactivate enzymatic browning followed by cooking in an acidified sugar syrup then contacting with a sulfiting agent and then dehydrating. The fruit piece prepared in this manner has a soft texture, even when dried to a low water activity (Aw) and can be combined with a ready-to-eat cereal.

Other references of interest include U.S. Pat. No. 3,892,870 by Wood which teaches a process for preparing an artificial fruit comprising making a first matrix of a low-methoxy pectate gel followed by dispersing a starch or agar gel within the pectate gel said starch or agar gel optionally containing fruit pulp. The resulting product is gelled and cut into the desired size. U.S. Pat. No. 4,401,681 by Dahle on the other hand, teaches the prevention of moisture transfer between food products of high and low moisture components by providing an impermeable barrier layer of pectin and dextrose on the exterior of the high moisture component. U.S. Pat. No. 4,504,504 by Gaehring teaches a method of preserving the texture of fresh fruit and vegetable-fruit products wherein diced, pectin-containing fruit pieces are thoroughly impregnated with sodium alginate, then contacted with a calcium solution. A product with a firm texture is obtained. It is believed that the firm texture is a result of the interaction of the gelled matrix of alginate and pectin. U.S. Pat. No. 4,117,112 by Bradshaw discloses a fruit product having a firm outer skin and a softer interior. In the preparation of this product, fruit pulp or puree is mixed with alginate or pectate salt to form a mixture. The mixture is then extruded into drops which are contacted with a calcium solution. The drops upon contact with the calcium solution form a skin of calcium alginate on the outer surface while maintaining a soft core. The drops are subsequently heated to between 70° and 100° C. Finally, U.S. Pat. No. 3,922,360 by Sneath teaches a fruit puree containing calcium which is coated with alginate and extruded into a calcium bath. Notably, the fruit composition itself contains calcium ions which gels the alginate from the inside concomitantly with gelatin by the action of the exterior calcium ions. The skin formed by this process is better defined and more firmly set than a gelation process where calcium is only present in the exterior solution.

It is an object of the present invention to develop a fruit product possessing an Aw of from 0.2 to 0.5 that retains its soft texture in the presence of cereal flakes having a low starting moisture, i.e., cereal having 2-3% moisture.

Another object of the present invention is to provide a fruit piece that remains soft even after the same is combined with a cereal flake and the combination attains equilibration under various storage conditions.

A further object of the present invention is to provide a cereal product which maintains its crispness while packaged with a fruit piece and the combination allowed to equilibrate.

SUMMARY OF THE INVENTION

The present invention is concerned with a fruit piece suitable for combination with a crisp, dry food product having a moisture as low as 2% and wherein the fruit piece maintains its softness and the food product maintains its crispness after the fruit piece and food product admixture have been allowed to equilibrate under various storage conditions. The novel fruit pieces of this invention are based on a unique combination of ingredients which comprise fruit solids, a sugar-glycerol containing humectant system, a fruit concentrate, a gelling or setting agent, an edible food grade acid, colors and flavors, the humectant system being present in amounts sufficient to produce a fruit piece with an Aw between about 0.2 and 0.5. Equally important to the practice of the present invention is a unique process for preparing a novel fruit piece comprising: preparing a liquid portion comprising water, edible food grade acid, a gelling or setting agent, a humectant system, fruit concentrate, flavor and color; preparing a solid portion comprising a fruit solids and color; heating the liquid portion; adding the solid portion to the heated liquid portion and mixing; extruding the heated mixture into fruit strands; allowing the strands to cool for a time sufficient to equilibrate; and cutting the strands into discrete fruit pieces.

DETAILED DESCRIPTION

The present invention is concerned with the composition of a fruit piece fabricated from solids of fruit materials to be used as a substitute for natural fruit which may be consumed individually or combined with other food material for consumption. The present invention is also concerned with the process for preparing the simulated fruit product. The fruit piece of the present invention must be suitable for combination with a dry food product having a moisture as low as 2% while maintaining its softness and the food product maintaining its crispness after the combination and the finished product is allowed to equilibrate under various storage conditions. The simulated fruit piece comprises a fruit concentrate; gelling or setting agent; edible food grade acid; coloring; a humectant system which contains both sugar and glycerol in amounts sufficient to produce a fruit piece with an Aw between about 0.2 and 0.5; and, fruit solids in amounts ranging from 25% to 60% by weight of the fruit piece.

The fruit solids of the present invention should generally be of the type which are susceptible to flavor impregnation. This will allow for the creation of a variety of different fruit pieces from a single source of fruit solids. The fruit solids may exhibit a bland flavor or tone which is easily masked so that the flavor of the simulated fruit will be the dominant flavor. The texture of the simulated fruit composition may be manipulated to produce a variety of fruit pieces. For instance, depending on the end product desired the formulation may allow for the addition of different fruit flavoring and concentrates to produce the desired product. Apple solids such as apple powder and apple granules are the preferred fruit solids around which different named fruits may be formulated. Apple solids because of their unique texture and sugar composition, contribute in a major way to the texture and humectancy of the fabricated fruit piece. In addition, the pectin component of apple helps in providing the set for the fabricated fruit piece. Other fruit bases, however, such as citrus and non-citrus fruits and combinations thereof may be utilized as the source of fruit solids. The amount of fruit solids will vary depending on the end fruit desired. Typically, the amount of fruit solid (dry weight basis) generally ranges from about 25.0% to about 60.0% by weight of the fruit piece and preferably from about 45.0% to about 55.0% by weight.

In order to impart a suitable fruit flavor to the simulated fruit piece, a fruit concentrate may be added. The variety of concentrate added is dependent upon the fruit piece desired. The concentrate may be in a powdered or a liquid form depending upon the form of the concentrate which is commercially available. The optional concentrate may be a member selected from a group consisting of blueberry concentrate, strawberry concentrate, peach concentrate, pineapple concentrate, prune concentrate and combinations thereof. Typically, the amount of fruit concentrate will vary depending on the flavor impact or intensity desired. Concentrate levels ranging from about 0 to about 10% by weight are suitable. However, the preferred levels generally range from about 1% to about 5% by weight.

In order to maintain the texture and mouthfeel of the fruit piece a gelling or setting agent is added. The type of gelling or setting agent will vary depending upon the fruit piece desired. However, pectin has proven to be suitable over a wide range of application pectin contributes in providing a gel set and is generally available in two forms, namely, high-methoxy and low-methoxy pectin. While the high-methoxy pectin is preferred in the present invention, the other pectin type may be used. The pectin used must be able to provide a good set. It should also be noted that in the case of apple powder and granules, the indigenous pectin present therein also contribute to the texture and set of the fruit piece. The total amount of pectin present including any pectin present in the fruit (e.g., apple) solids, should generally range from about 1% to about 10% by weight and preferably from about 1% to about 5% by weight. In the case of other gelling agents such as starch, gums or alginates, the effective amounts will vary.

An edible food grade acid such as citric, lactic, malic or fumaric can be included in the fruit matrix to give a desired tartness to the fruit product. The amount of food grade acid utilized is usually dictated by taste but usually falls within the range from about 0% to about 2% by weight.

In order to impart the desired sweetness to the fruit piece, a sweetener is generally added. The type of sweetener may vary depending upon the desired functional characteristic in a particular system. Suitable sweeteners may include high fructose corn syrup, crystalline fructose, sucrose, artificial sweeteners and combinations thereof. The preferred sweetener however is high fructose corn syrup. The sweetener also functions as a part of the humectant system thereby contributing to the storage stability of the fruit piece. The amount of sweetener will vary depending upon the humectant system being utilized. Generally, the amount of sweetener should range from about 5.0% to about 35.0% by weight of the simulated fruit piece and preferably from about 15.0% to about 25.0% by weight.

The basic requirement for a soft fruit piece is to have a humectant system which will keep the fruit pliable and soft at an Aw within the range of from 0.2 to 0.5 which is the water activity of most dry food products such as cereal products. The humectant system generally comprises glycerol and high fructose syrup. The use level of the humectant in the present invention is calculated to give a final product Aw between about 0.2 to about 0.5, preferably from 0.25 and 0.35.

A humectant system suitable for a wide range of fabricated fruit pieces comprises glycerol in amounts ranging from about 15% to about 30% by weight of the simulated fruit piece and preferably from about 18% to about 23%, in combination with the previously referred to level of sweetener. However the preferred sweeteners are crystalline fructose or high fructose corn syrup because in addition to the desirable sweetness which they impart they contribute along with glycerol in the humectant system. The ingredients of the simulated fruit piece may also include a buffer in amounts sufficient to produce a pH of from 3 to 4 and preferably about 3.5. The buffer typically comprise a mixture of citric acid and sodium citrate in solution.

In order to achieve the desired simulated product, colors and flavors may be added. These colors and flavors will generally correspond with the desired named fruit.

In order to achieve the optimum texture (i.e., texture similar to the natural product), the level of fruit solids must be such that it allows the simulated product to mimic the texture of the natural product. Fruit solids in an amount ranging from about 25% to about 60% are suitable However, preferred levels typically range from about 45% to about 55%.

The finished fruit may be packaged with a dry food product such as a cereal product without affecting the texture of either component during storage.

The present invention is also concerned with a process for preparing the simulated fruit product of the present invention. The fruit product must be suitable for combination with a dry food product having moisture as low as 2% and wherein the fruit piece maintains its softness and the food product maintains its crispness after the fruit piece and food product have been allowed to equilibrate under various storage conditions.

In the first step of the present invention, a liquid portion is prepared. The liquid portion generally comprises a buffer, preferably a mixture of citric acid and sodium citrate in solution, glycerol, high fructose corn syrup and/or crystalline fructose and pectin. Any fruit concentrate, flavors or colors may be added to the liquid portion. The amount of these ingredients will vary depending upon the end product desired.

Typically, the amount of citric acid ranges from about 0.3% to 1.0% by weight and preferably from about 0.5% to about 0.8% by weight; the amount of sodium citrate ranges from about 0.1% to about 0.4% by weight and preferably from about 0.1% to 0.3%; the amount of glycerol ranges from about 15% to about 30% by weight and preferably from about 18% to about 23%; high fructose corn syrup solids or other sweetening composition such as crystalline fructose in amounts ranging from about 5% to about 35% and preferably from about 15% to about 25%, all by weight of the total fruit piece.

In the second step of the present invention a solid portion is prepared. The solid portion of the present invention generally comprises the fruit solids and may include other optional ingredients such as color, flavor and the like. The fruit solids are preferably selected from a group consisting of apple solids and other pectin containing fruit solids having apple-like properties and combinations thereof. The most preferred fruit solids are apple granules and powder with the ratio of apple granules to apple powder generally ranging from 0.8:1.0 to 1.0:0.8.

The liquid portion is first heated to temperatures ranging from 60° to 100° C. and preferably from 90° to 95° C. to insure uniformity of the mixture after which the solid portion is added. The combination of liquid and solid portion is then mixed. This generally takes about from 1 to 4 minutes.

The ratio of liquid portion to solid portion generally determines the end product softness. A ratio of 1:1 will give a soft texture at an Aw of 0.3 or higher. If a softer texture is desired, a higher liquid to solid ratio should be used, i.e., essentially increasing the level of humectant in the mixture. If wetted cereal flakes are combined with the simulated fruit piece or if the product is stored, in high humidity storage, then lower ratios such as 0.8:1.0 will keep the fruit pieces soft. A 1.1:1.0 ratio of liquid portion to solid portion will give a very soft and stable fruit product. However, the extruded fruit strand may be too soft if a very high liquid to solid ratio is used. In this instance care must be taken in handling and cooling the strands prior to cutting.

While still hot the mixture is shaped. This is generally accomplished by passing the mixture through a former such as an extruder or a pasta machine. The former shapes the mixture into continuous ropes or strands. The shape will depend upon the final fruit desired. The extruded product is allowed to cool to equilibrate and to completely hydrate the fruit solids (e.g., apple powder and granules). After cooling, the rope is cut into the desired shape and form.

When lower temperatures are used in the liquid phase (i.e., temperature between about 60° C. and 90° C.) a longer time will be needed to set the thickener (e.g., pectin) and to hydrate the fruit pieces during cooling. In this instance, setting generally takes place even after the extrusion of the fruit strands.

The extruded fruit piece or the cut strands tend to stick together unless it is coated with a non-sticking material. Suitable non-sticking materials include, sucrose, dextrose, dextrins, starch, and fatty materials. However, the best coatings were attained when the extruded fruit pieces are coated with powdered glycerol monostearate. The level of dusting generally ranges from about 0.1% to about 2.0% by weight of the fruit piece.

Another embodiment for accomplishing the objective of the present invention comprises metering the unheated liquid and solid into an extruder having both a mixing and heating section and extruding the heated mixture into the desired shape.

The following examples further illustrate the present invention and is not intended to limit the scope of the invention in any manner or form.

EXAMPLE 1

The following formulation for simulated strawberry and blueberry pieces were prepared.

| Ingredients | Strawberry | Blueberry |
|---|---|---|
| Apple Granules (blue) | — | 27.50 |
| Apple Granules (red) | 27.50 | — |
| Apple Powder | 27.50 | 27.50 |
| Glycerol, Anhydrous | 19.53 | 19.53 |
| HFCS (90% fructose) | 19.53 | 19.53 |
| Pectin, High Methoxy (DM 58–62%) | 2.69 | 2.69 |
| Water | 0.55 | 0.47 |
| Citric Acid, Monohydrate | 0.84 | 0.84 |
| Tri-sodium Citrate, Dihydrate | 0.28 | 0.28 |
| Blueberry Juice Conc. 45° Brix | — | 1.33 |
| Strawberry Juice Conc. 51° Brix | 1.33 | — |
| Blueberry Flavor | — | 0.22 |
| Strawberry Flavor | 0.24 | — |

The citric acid and sodium citrate were added to water. The mixture was heated to facilitate the formation of a solution. The glycerol and HFCS were also mixed together and added to the acid solution. The pectin was also dispersed in the glycerol/HFCS mixture. The juice concentrates and flavors were also added and the combination mixed to form the "liquid portion". Equal parts of apple powder and apple granules were mixed to form the fruit base or the "solid portion".

The liquid portion was placed in a Sigma Mixer and heated to 92° C. and the solid portion added. The ratio of liquid to solid portion was about 0.8:1.0. the combination was mixed for 2 minutes until a translucent mixture was formed. While still hot the translucent mixture was extruded from a Werner-Pfleiderer twin screw extruder into a rope. The rope was cooled overnight and cut into fruit pieces having a cylindrical diameter of 5/16" and length of 3/16". To prevent the fruit piece from sticking together, they were coated with 1% fat (Durkee KLX) followed by 1% dextrose powder.

The Aw of the fruit pieces was 0.35 at 25° C. and 14% moisture content. The above products were mixed with unwetted Bran Flakes (Post ®) and stored at 70° F./50% relative humidity for 16 weeks. In the resulting product, the fruit pieces maintained their softness and the cereal flakes maintained their crispness.

EXAMPLE 2

The ratio of liquid portion to the solid portion described in Example 1 was modified to produce a ratio of 1:1. This provided a higher glycerol level to insure that the fruit nugget stay soft when added to unwetted flakes. The formulation was as follows:

| BLUEBERRY (L/S = 1:1) | |
|---|---|
| Ingredients | |
| Apple Granules | 25.00 |
| Apple Powder | 25.00 |
| Glycerol, Anhydrous | 21.74 |
| HFCS (90% fructose) | 21.74 |
| Pectin, High Methoxy (DM 58-62%) | 3.00 |
| Water | 0.52 |
| Citric Acid, Monohydrate | 0.94 |
| Tri-sodium Citrate, Dihydrate | 0.31 |
| Blueberry Conc. 45 Brix | 1.48 |
| Blueberry Flavor | 0.25 |

Simulated fruits were prepared using a Werner Pfleiderer (WP) twin screw extruder as in Example 1. The cut pieces were dusted with 1% glycerol monostearate to prevent the pieces from sticking together. In the course of a two day run with the WP extruder (130 lbs. blueberry nuggets), the average glycerol analysis was 23.21% to 25.20%. The water activity was 0.30.

In this process the throughput of the extruder was 6 kg/hr. The mixture of apple granule and powder was metered into the extruder. At the same time the liquid portion/humectant was also pumped into the extruder at a specified rate. The ratio of liquid phase to fruit solids determines the final texture of the fruit pieces.

The heating zones of the extruder were set at the following temperatures. Zone 1 at 110° C.; Zone 2 at 110° C.; Zone 3 at 45° C. and Zone 4 at 45° C. The product temperature up on exiting the extruder was 55° C. Using the base formulation at a ratio of 1.1 to 1.0 liquid to solid portion produces a more desirable fruit piece (i.e., no grittiness from unhydrated apple bits were detected after equilibration was attained).

During the forming stage, it was important not to have a back pressure greater than 50 psig to avoid shearing of the gel matrix. A continuous intact gel matrix is essential to maintain a good quality fruit-like texture.

What is claimed is:

1. A process for preparing simulated fruit pieces for combination with a dry crisp breakfast cereal flakes having a moisture content as low as 2% wherein the fruit pieces maintain their softness and the cereal flakes maintain their crispness after the fruit pieces and the cereal flakes equilibrate during storage consisting essentially of in % by weight:
   (a) preparing a liquid portion consisting essentially of 15 to 30% glycerol, 5 to 35% fructoses, 1 to 10% pectin, a buffer to provide a pH of 3 to 4, 0 to 10% fruit concentrate, flavors, color and water;
   (b) preparing a solid portion consisting essentially of 25 to 60% apple solids and color;
   (c) heating the liquid portion to temperatures ranging from about 60° to about 100° C;
   (d) combining the solid portion with the heated liquid portion at a ratio of 0.8:1.0 to 1.0:1.1 and mixing to form a heated mixture;
   (e) extruding the heated mixture into strands;
   (f) allowing the strands to cool for a time sufficient to equilibrate and hydrate the fruit solids to produce an Aw of 0.20 to 0.35;
   (g) cutting the strands into discrete fruit pieces; and
   (h) dusting the fruit pieces with a member selected from the group consisting of sugar, dextrin, fat, oil or combinations thereof.

2. A process according to claim 1 wherein the glycerol is present at 18 to 23% and the fructose is high fructose corn syrup present at 15 to 25%.

3. A process according to claim 2 wherein the amount of fructose is the same as the amount of glycerol.

4. A process according to claim 3 wherein the pectin is a high methoxy pectin at 1–5% by weight of the fruit piece.

5. A process according to claim 4 wherein the apple solids are selected from the group consisting of apple granules, apple powder or combinations thereof at 45–55% by weight of the fruit piece.

6. A process according to claim 5 wherein the solid portion is combined with the liquid portion at a ratio of 1:1.

* * * * *